United States Patent [19]

Mattinger et al.

[11] Patent Number: 5,030,902

[45] Date of Patent: Jul. 9, 1991

[54] MECHANISM FOR AN ELECTRICAL APPLIANCE

[75] Inventors: Detlef Mattinger, Bickenbach; Karl Trinkaus, Darmstadt, both of Fed. Rep. of Germany

[73] Assignee: Wella Aktiengesellschaft, Darmstadt, Fed. Rep. of Germany

[21] Appl. No.: 347,331

[22] Filed: May 3, 1989

[30] Foreign Application Priority Data

May 11, 1988 [DE] Fed. Rep. of Germany ....... 3816070
Jul. 23, 1988 [DE] Fed. Rep. of Germany ....... 3825120

[51] Int. Cl.$^5$ .................. H01M 10/46; B26B 7/00
[52] U.S. Cl. .................. 320/2; 30/DIG. 1
[58] Field of Search .................. 320/2; 30/DIG. 1

[56] References Cited

U.S. PATENT DOCUMENTS 3,371,260  2/1968  Jackson et al. .................. 320/2
3,379,952  4/1968  Tarrson .................. 320/2
3,525,912  8/1970  Wallin .................. 320/2 X
3,710,224  1/1973  Daniels .................. 320/2

Primary Examiner—R. J. Hickey
Attorney, Agent, or Firm—Michael J. Striker

[57] ABSTRACT

The mechanism for the electrical appliance, especially for a hair cutting device, for line voltage or battery-powered operation comprises a tool portion with a rechargeable battery and an adapter, which is easily connected by a cable with a current source and which has means for easy maintenance and for easy connection and disconnection with the tool portion. The electrical appliance may also have a holder for the tool portion in which the tool portion can be held with the adapter connected. The tool portion may be easily detachable from the adapter held in the holder during battery powered operation or alternatively the tool portion with the adapter connected may be easily removed from the holder when the tool portion is energized by the line voltage.

7 Claims, 16 Drawing Sheets

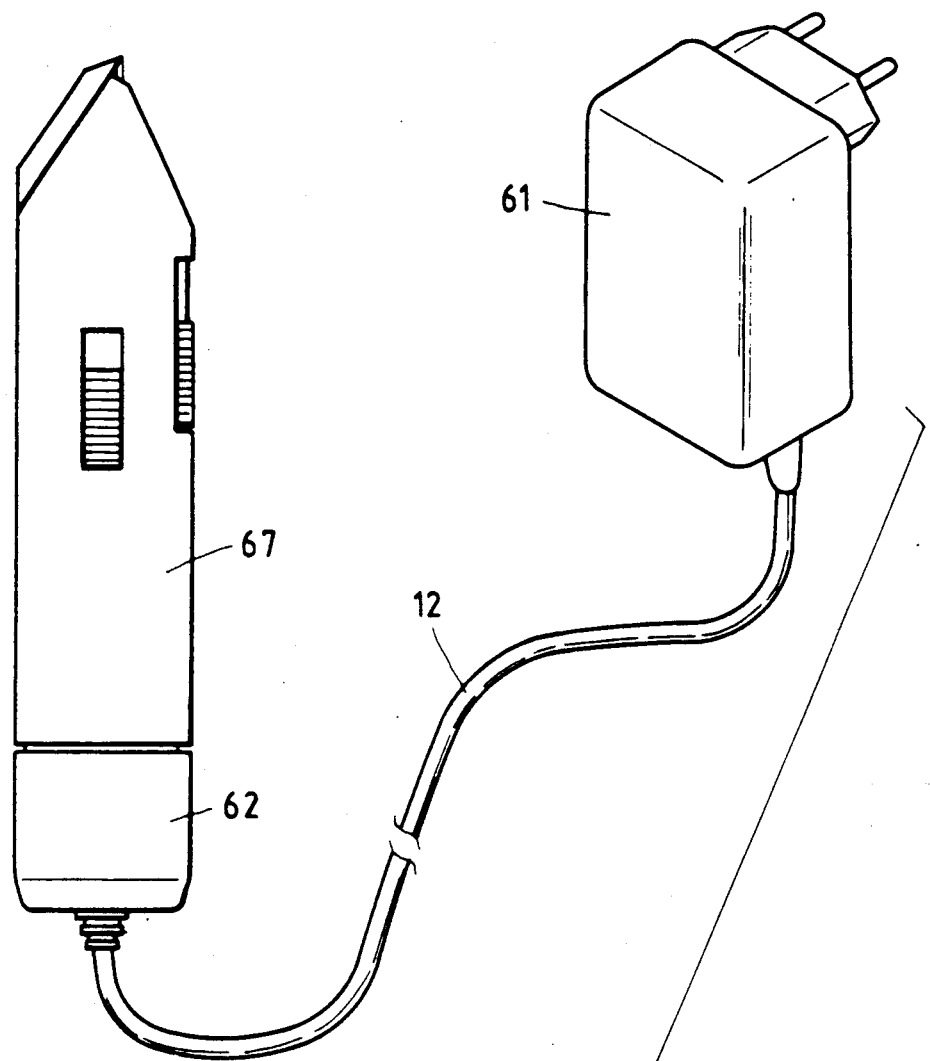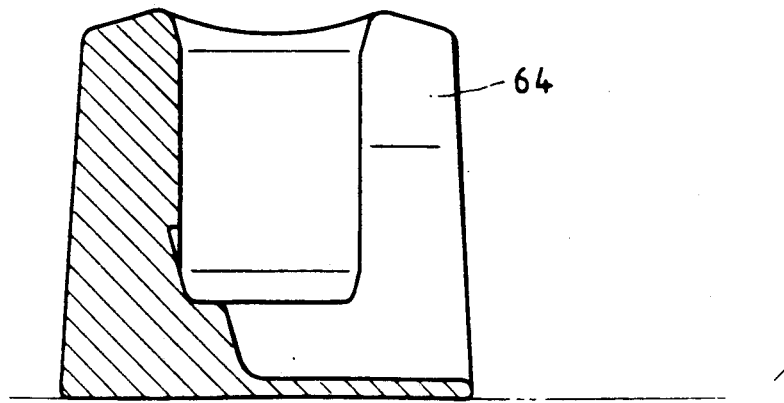
Fig. 11

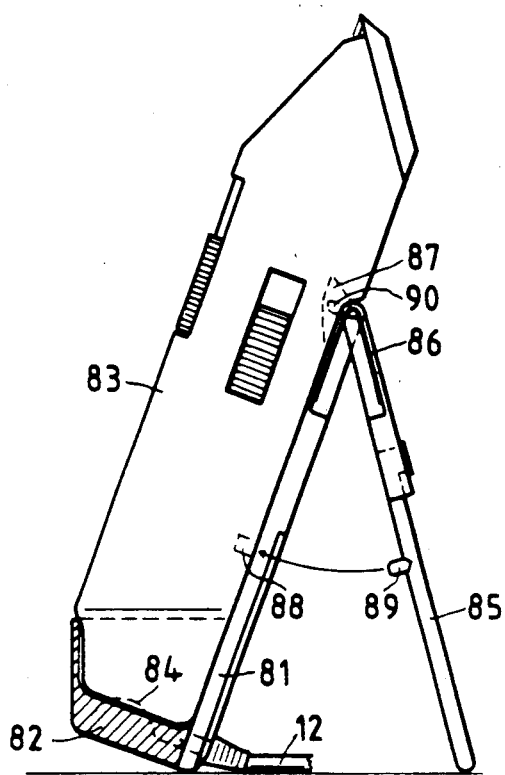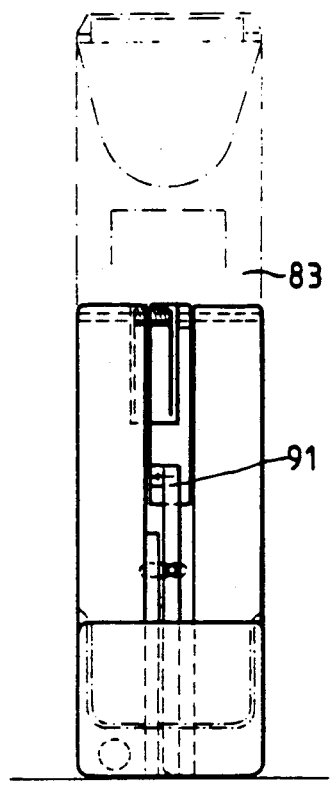
Fig. 12 Fig. 13
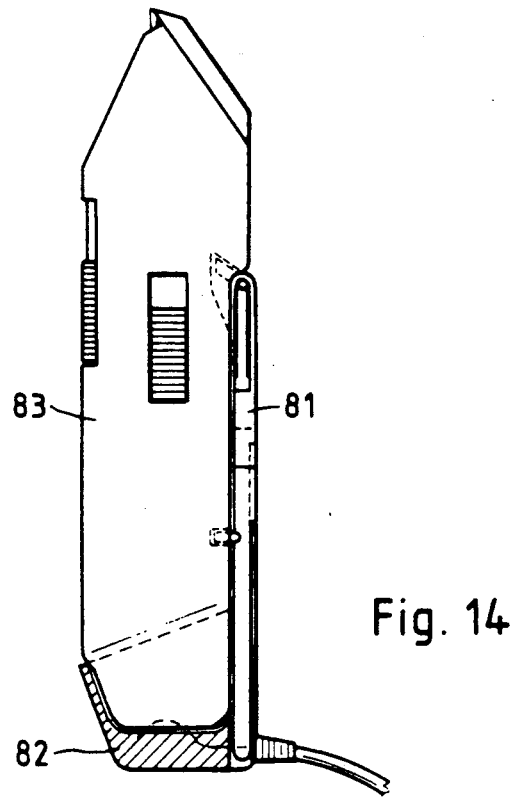
Fig. 14

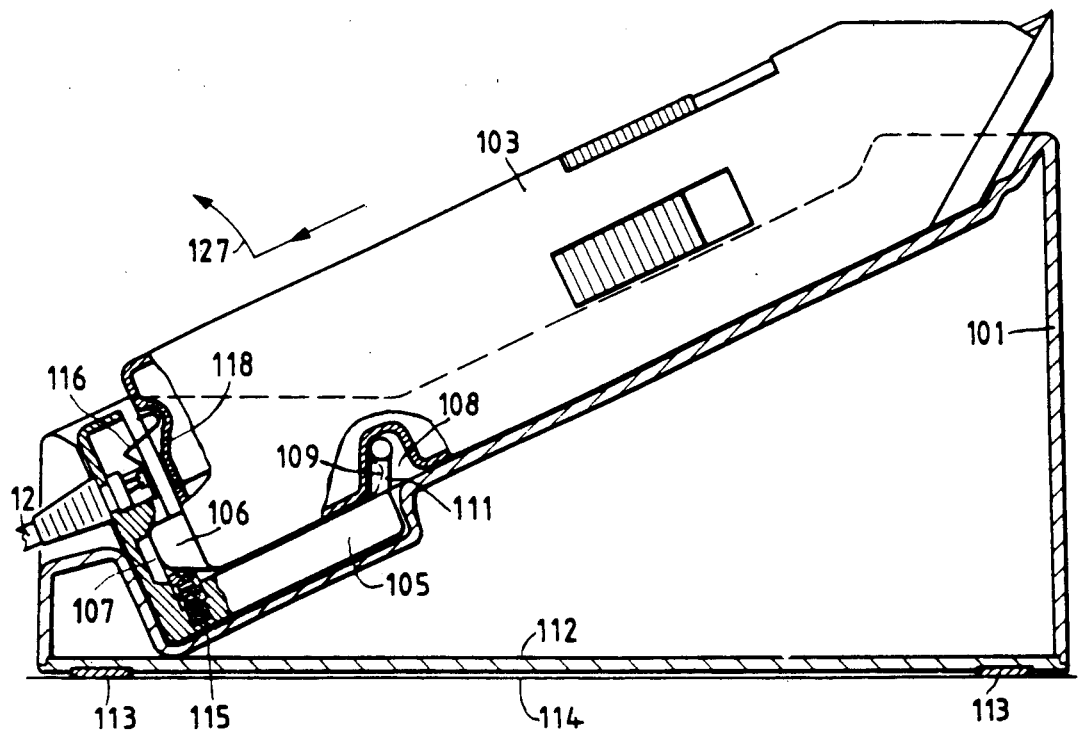
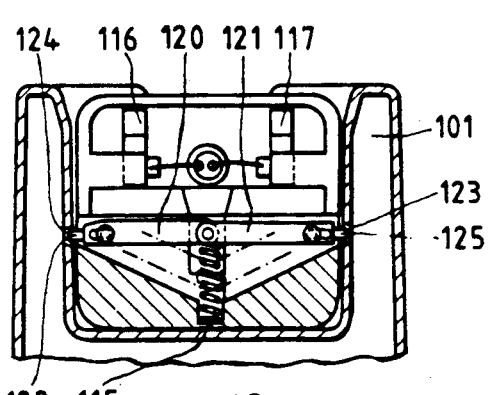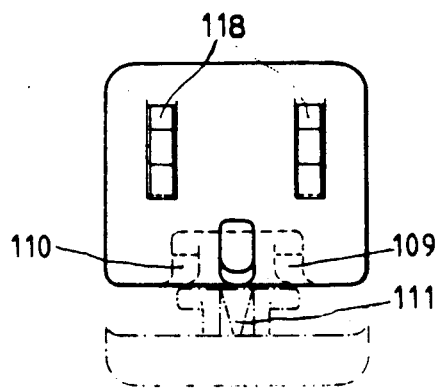

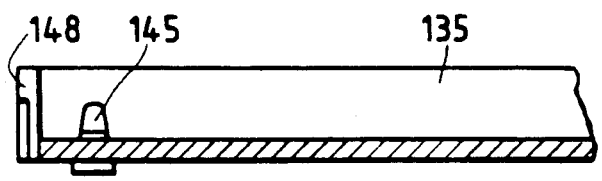
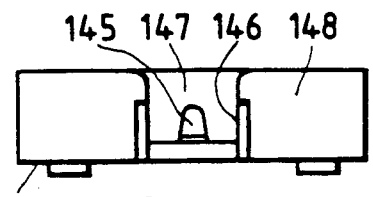
Fig. 25    Fig. 26
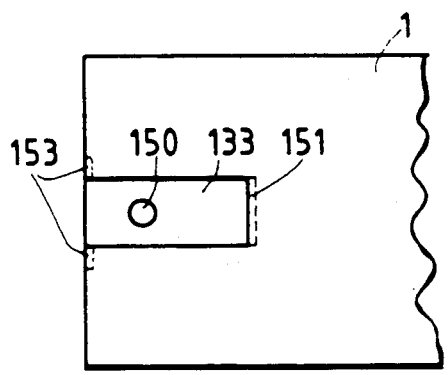
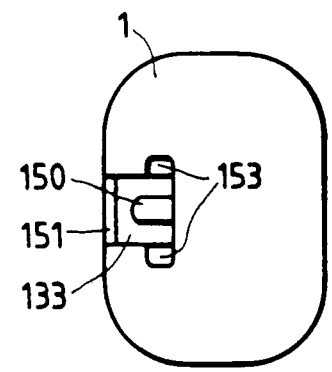
Fig. 27    Fig. 28
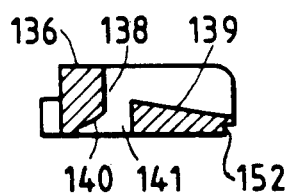
Fig. 29a
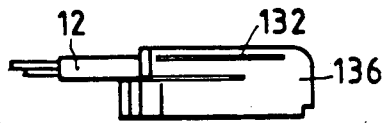
Fig. 29b
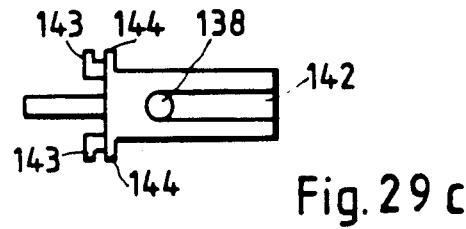
Fig. 29c
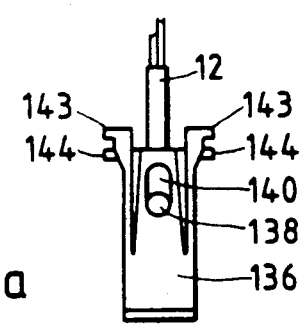
Fig. 30a
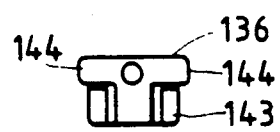
Fig. 30b

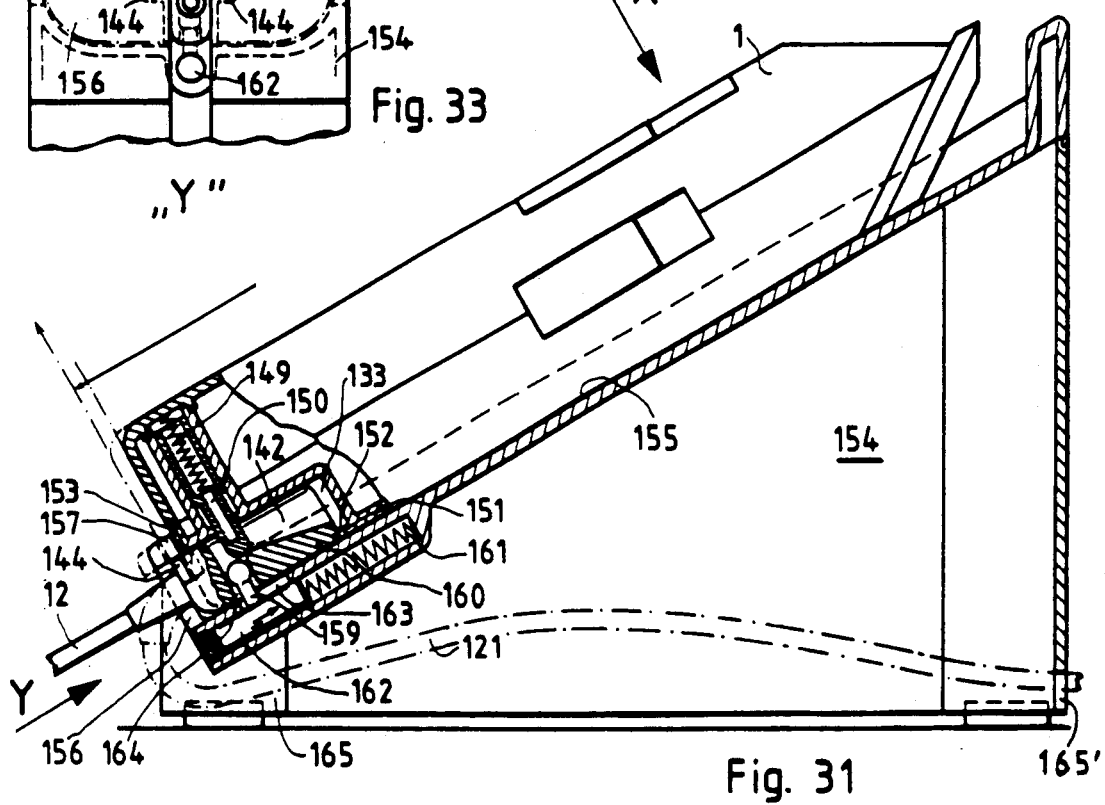
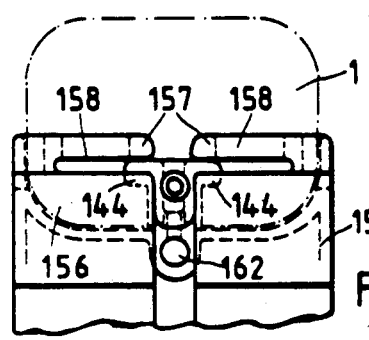
Fig. 33 "Y"
Fig. 31
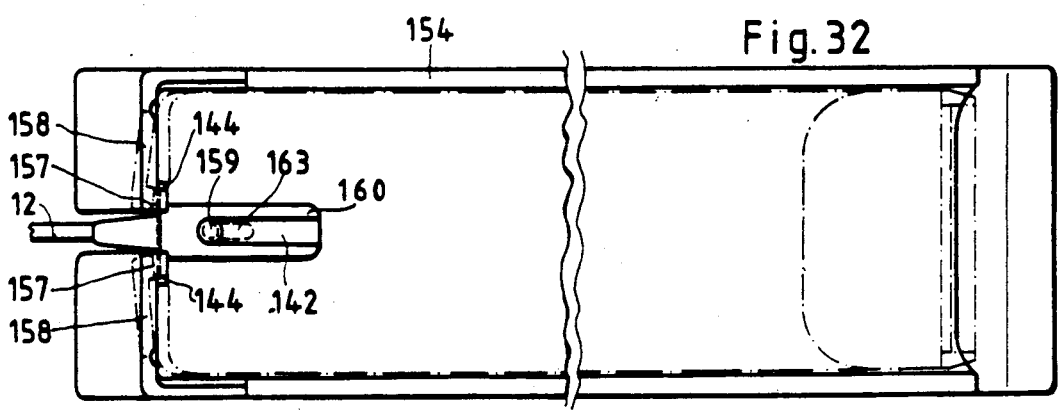
Fig. 32 "X"

MECHANISM FOR AN ELECTRICAL APPLIANCE

BACKGROUND OF THE INVENTION

My invention relates to a mechanism for an electrical appliance and, more particularly, to a mechanism for a hair cutting device having a rechargeable battery powered by either line voltage or the battery.

To allow unrestricted mobility a hair cutting device with a built in rechargeable battery is used preponderantly in hair dressing which, when not in use, is inserted in a holder which simultaneously acts as a charging device. Furthermore spring-like contacts, on which the device being charged presses of its own weight, are provided in the holder. Current or power is supplied to the spring-like contacts from a power supply unit which is integrated in a line-powered power supply plug, so that the battery is subsequently charged.

Because of ergonomic considerations a hair cutting device should be both small and light which, of course, provides negative constraints on the life of the battery charge. It is especially important that on discharge of the battery during hair cutting the hairdresser has the option to continue to operate the unit.

SUMMARY OF THE INVENTION

Accordingly, it is an object of my invention to provide a mechanism for an electrical appliance which permits continuous operation of a tool portion of an electrical appliance powered by a rechargeable battery when the battery charge is substantially absent or nonexistent, but without troublesome and time-consuming manipulations.

In keeping with this object and with others which will become apparent hereinafter, an adapter is connected by a cable with a current source and has means for making a releasable connection with the tool portion, which in the case of a hair cutting appliance advantageously comprises the hair cutting device.

The mechanism of our invention has the advantage that on consumption of the charge in the battery the hair cutting device is placed in the adapter and locked with a simple motion whose nature depends on which embodiment is involved. The motion occurs advantageously when the entire unit(hair cutting device, adapter, charging stand) is moved on a stand surface(table). A vertical motion is especially appropriate.

Because of that the hair cutting device or tool portion can be supplied directly from the power supply. Simultaneously the battery can be charged. Thus the power supply can be a current supply unit, advantageously integrated in a line-connected power supply plug. However the hair cutting device or tool portion can also be structured so that the adapter can adapt only the power cable. In the scope of our invention spring contacts provide electrical connection between the hair cutting device or tool portion and the adapter. An inductive energy transfer is similarly possible.

A further advantage is attained because a rechargeable battery of smaller capacity can be used, since by simple steps line operation is possible when the capacity is exceeded. Because of that a more economical battery can be used and the unit weight can be reduced(improved handling).

Our invention is not only suitable for hair cutting devices but can also be used advantageously with other electrical tool portions which have a rechargeable battery for battery operation and which are operable with the line voltage when the battery is discharged—advantageously electrical razors and vacuum cleaners.

Advantageously according to our invention a holder is provided for receiving the tool portion and the adapter and additional connecting means for releasable connection of the adapter with the tool portion are provided so that the connection between the tool holder and the adapter can be released when the adapter is connected with the tool portion and the reverse.

In one advantageous embodiment of our invention the means for releasable connection comprises a magnetic circuit which is closed when the tool portion is connected with the adapter and spring contacts for electrical connection of the adapter with the tool portion.

In this additional embodiment only one magnetic circuit switch is provided in the tool portion to be operated to allow the adapter to be locked with the tool portion in the case in which the tool portion is energized with line voltage or to allow the adapter to be put down or deposited, advantageously in a holder, in the case of battery operation. Accordingly another form of our invention further provides the magnetic circuit with a coil, through which current is passed by a magnetic circuit switch mounted in the tool portion. It is also possible to provide a permanent magnetic circuit which can be broken either by a current flow or by a corresponding motion of one of the elements of the circuit.

According to another embodiment of our invention a holder is provided with a holder cavity for receipt of the adapter and the tool portion. A circuit means for electromagnetic connection of the adapter and the tool portion can be provided which makes the electrical connection between the tool holder and the battery when the charge in the battery is substantially exhausted or reduced.

According to another embodiment of our invention the means for releasable connection comprises at least one adapter spring, which urges the adapter and the tool portion apart, and at least one snap catch which enters into an undercutting of the tool portion against the spring force on pressing together the tool portion and the adapter and which is guided around the undercutting on further pressing together of the adapter and the tool portion.

In another advantageous embodiment of our invention the tool portion can be put in a very simple way in the holder, only a pressure on the tool portion being required to lock the adapter in or disengage it. Only operations with one hand are required to do this, the tool portion also being deposited or held with these same operations. Because of that only one pressure is required on the tool portion so that the other hand is not required.

The same advantageous action can be obtained in another embodiment of our invention when a known two-state device is used in the adapter, which takes a first stable position after a first pressure against a spring force and a second stable position after a second pressure has been applied, in the one position the tool portion being connected with the adapter while in the second position the mechanical connection between the tool portion and the adapter being released.

Finally there is an additional embodiment in which the adapter is formed as the holder. It can then be provided that the holder has a first leg extending over the greater portion of one side of the tool portion longitudinally and enclosing the lower portion of the tool portion, i.e. a hair cutting device, a second leg pivotally connected with the first leg being provided as a supporting limb, a spreading spring which spreads the second leg or supporting limb out from the first leg against a stop and a plurality of hooks provided on the supporting limb, which engage in undercuttings provided on the tool portion when the supporting limb is located in the vicinity of the first leg.

Several other embodiments of our invention are also possible which are described in detail in the following specific description, however the details of these embodiments presented in the following are not to be construed as limiting the appended claims which set forth the scope of our invention.

BRIEF DESCRIPTION OF THE DRAWING

The objects, features and advantages of my invention will be made more apparent from the following detailed description, reference being made to the accompanying drawing in which:

FIGS. 8 to 11 are partially side elevational, partially cross sectional views of a third embodiment of an electrical appliance in different stages of operation, FIGS. 12 to 14 are a plurality of views of a fourth embodiment of our invention, FIGS. 15 to 19 are a plurality of views of a fifth embodiment of our invention, FIGS. 21 to 30 are a plurality of views of a sixth embodiment of our invention, and FIGS. 31 to 34 are a plurality of views of a seventh embodiment of our invention.

DETAILED DESCRIPTION OF THE INVENTION

Figure 1:
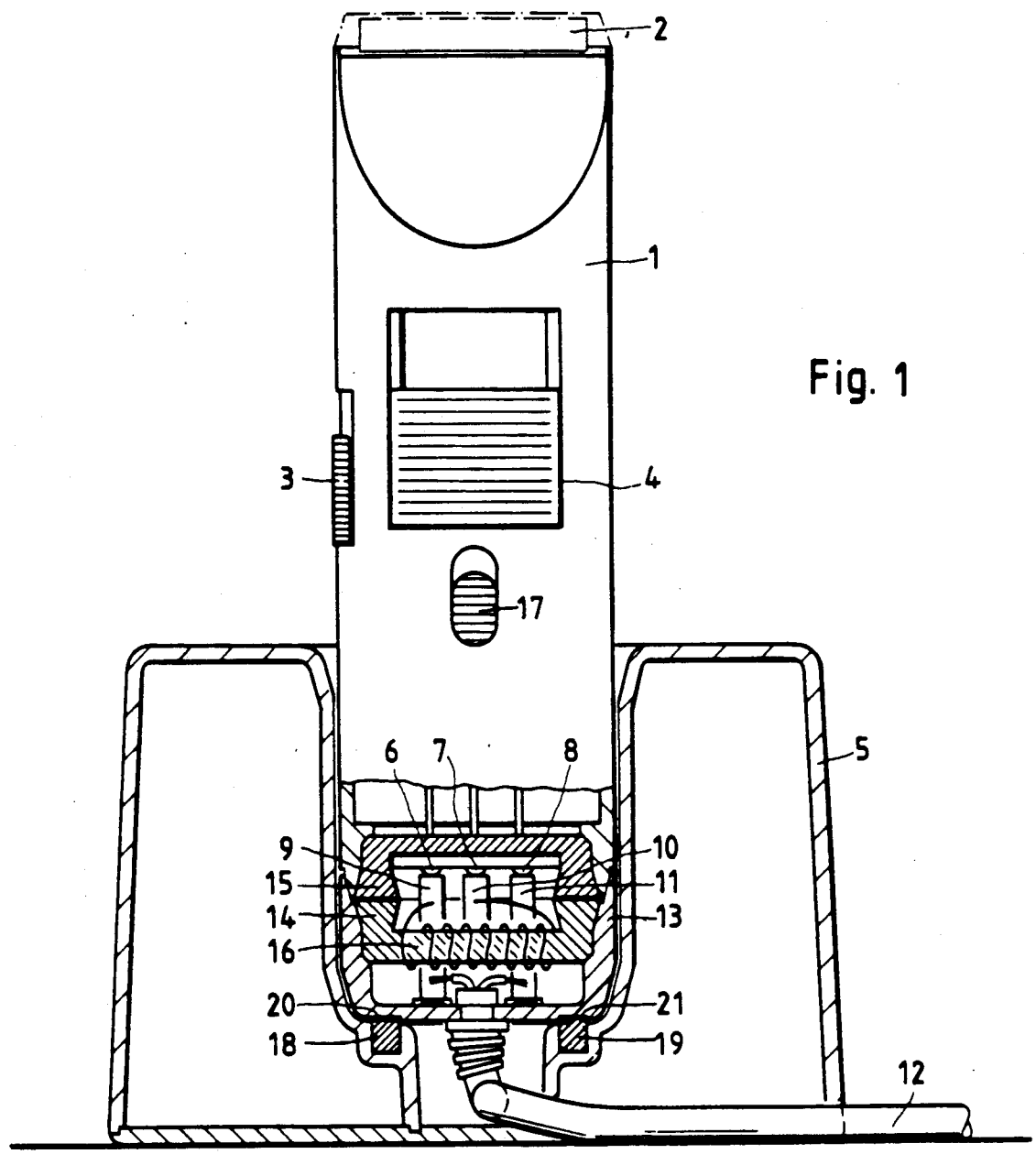
FIG. 1 is a side elevational view of a first embodiment of an electrical mechanism for an electrical appliance according to our invention.

The same parts in the different embodiments shown in the drawing are given the same reference numbers.

In the embodiment according to FIG. 1 a hair cutting device or tool portion 1 is provided in a known way with a cutting head 2, an on/off switch 3 and a mechanism 4 for adjustment of the cutting length. An unshown (in FIG. 1) motor and rechargeable battery for supply of the electrical energy needed for operation of the motor are located in the interior of the tool portion 1.

The tool portion 1 can be plugged in the holder 5 when the unit is not in use so that the contacts 6, 7 and 8 come into contact with the spring contacts 9, 10 and 11 so that the rechargeable battery 26 can be charged by a cable 12 from a current supply unit or power supply, which is not shown in FIG. 1.

To provide for line current operation when the battery is discharged, the spring contacts 9, 10 and 11 and the cable 12 are provided in an adapter 13, which can be removed from the holder 5 with the hair cutting device 1 as required. Thus the holder 5 has the form of an open ring so that the cable 12 can be similarly taken from the holder unit 5 with the adapter on withdrawal of the hair cutting device.

For locking of the adapter 13 a magnetic circuit is provided with the hair cutting device 1, which comprises two magnetic core halves 14, 15. The magnetic core half 15 is mounted in the hair cutting device 1 and the magnetic core half 14 is mounted in the adapter 13 and is provided with an electrical coil 16. A current can flow through the coil 16 when a switch 17 of the hair cutting device 1 is properly set so that the core halves can be pulled together. The lower portion of the housing of the hair cutting device 1 and the upper edge of the adapter 13 overlap so that the adapter 13 is connected sufficiently rigidly with the hair cutting device 1 as long as the current flows through the coil 16.

So that the adapter 13 is not removed from the holder 5 on lifting the hair cutting device 1 because of the residual undesirable magnetism, permanent magnets 18, 19 are provided in the embodiment according to FIG. 1, which act on anchor plates 20, 21 in the adapter 13. The magnetic circuit can be formed so that by stray lines of force, which arise on energizing the coil 16, the force of the permanent magnets 18, 19 is compensated.

Figure 2:
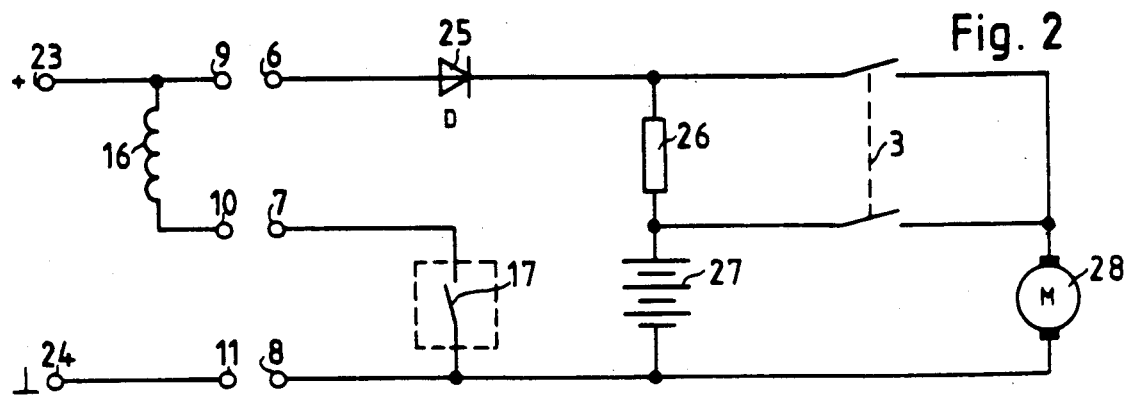
FIG. 2 is an electrical circuit diagram for the first embodiment of an electrical mechanism.
Figure 3:
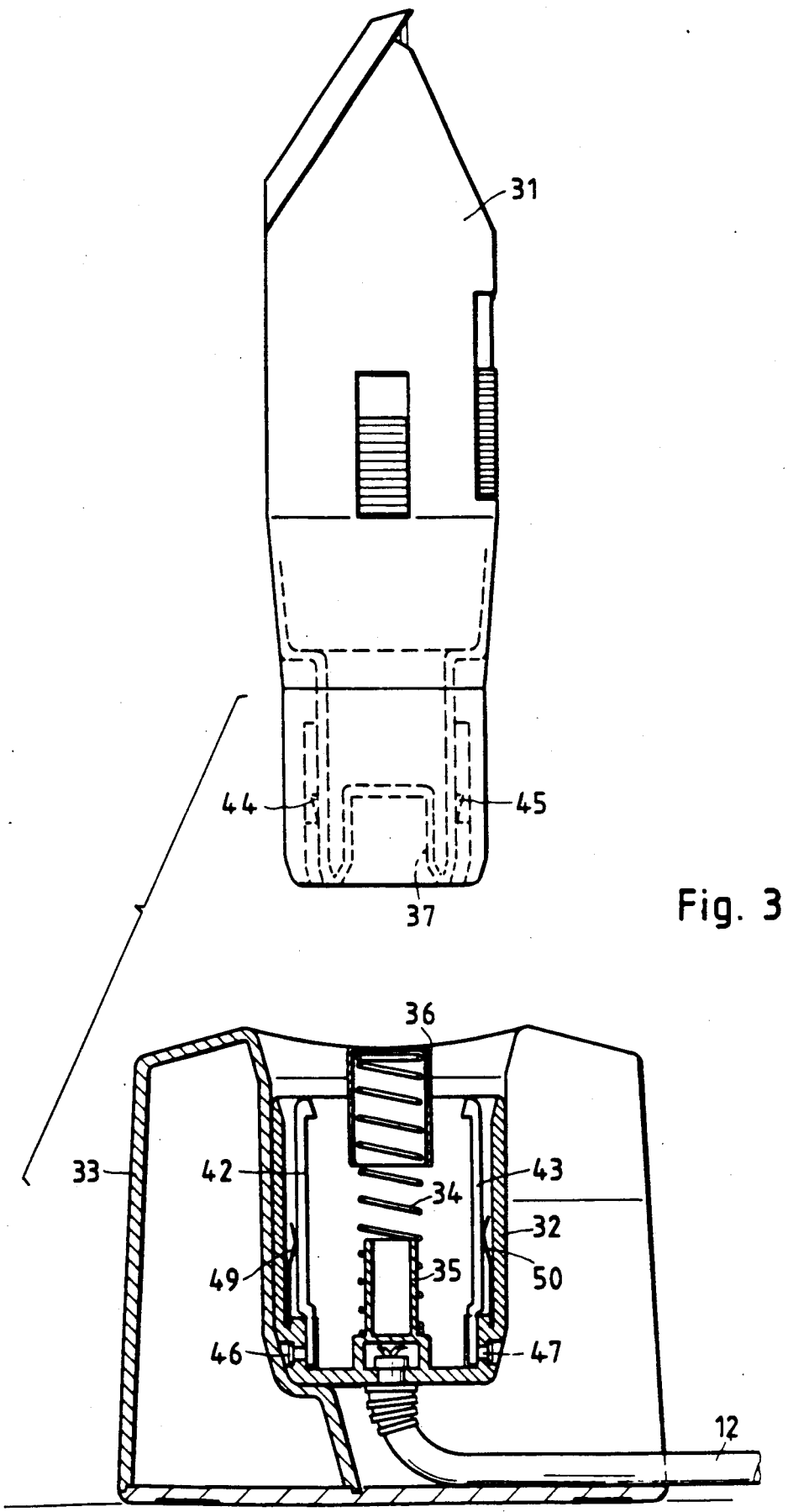
FIGS. 3 to 7 are partially side elevational, partially cross sectional views of a second embodiment of an electrical mechanism of an electrical appliance in different stages of operation.
Figure 4:
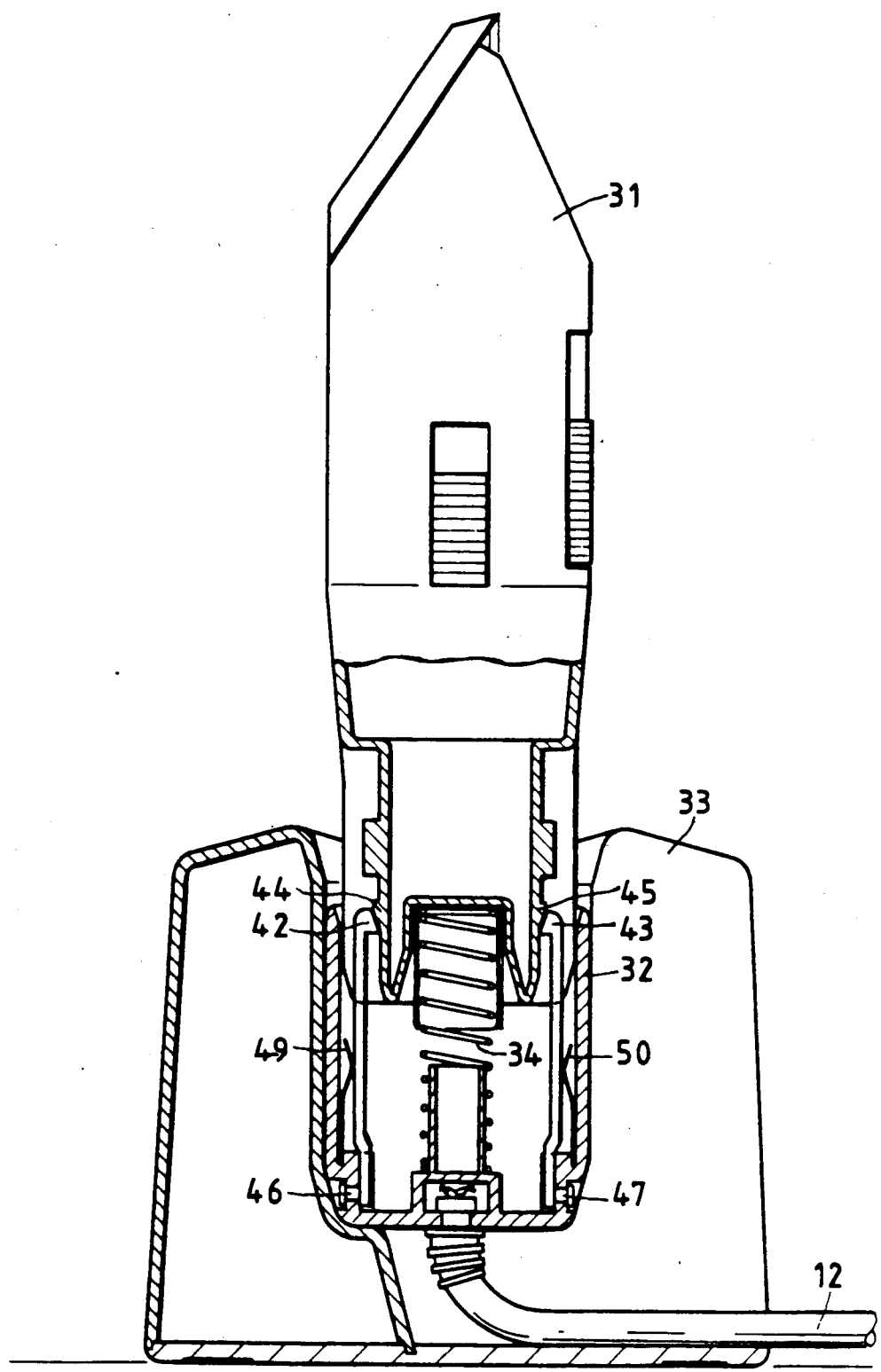

FIG. 2 shows a circuit diagram for the embodiment according to FIG. 1. Thus an equal voltage is fed over the strands of the cable 12 to the terminals 23, 24 from the unshown power supply unit (FIG. 1). The coil 16 is connected between the terminal 23 and the spring contact 10 and obtains current through the contacts 7, 8 and the switch 17, if the adapter should be connected with the hair cutting device mechanically. The battery is charged through a diode 25 which serves as a polarity protection and a resistance 26. The diode 25 also acts as a protection for short circuits in making contact and for discharge of the battery 27 through the internal resistance of the power supply unit in a power outage or with a pulled out power plug. A double-pole switch 3 energizes the motor 28. Thus it is guaranteed that the motor 28 is directly connected with the battery 27 during battery-powered operation and is connected directly, which means without interposition of the charging resistor 26, with the line voltage through the diode 25 during line voltage operation of the hair cutting device 1.

Figure 5:
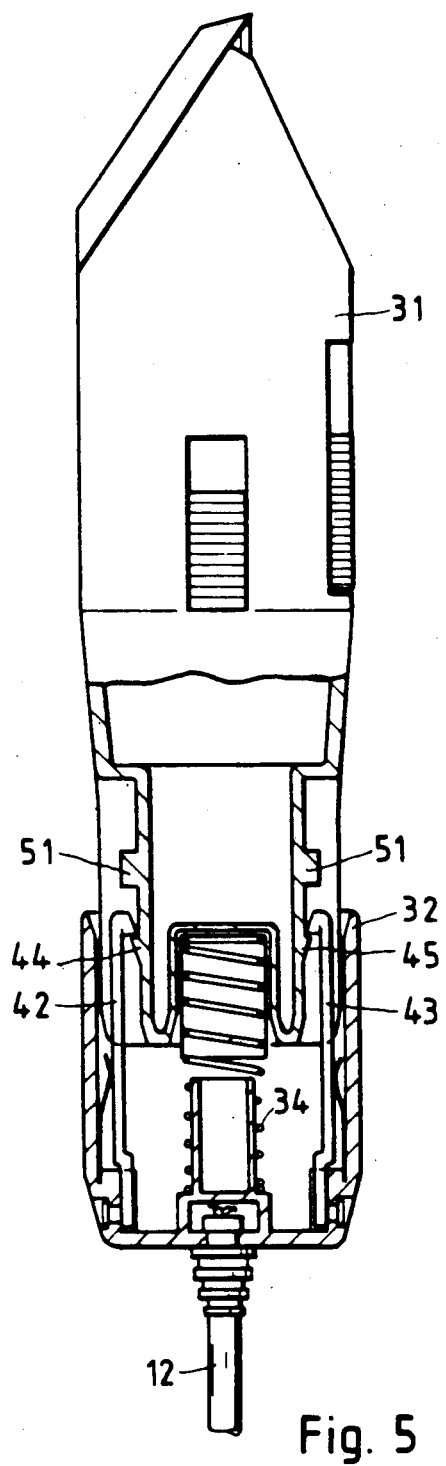
Figure 6:
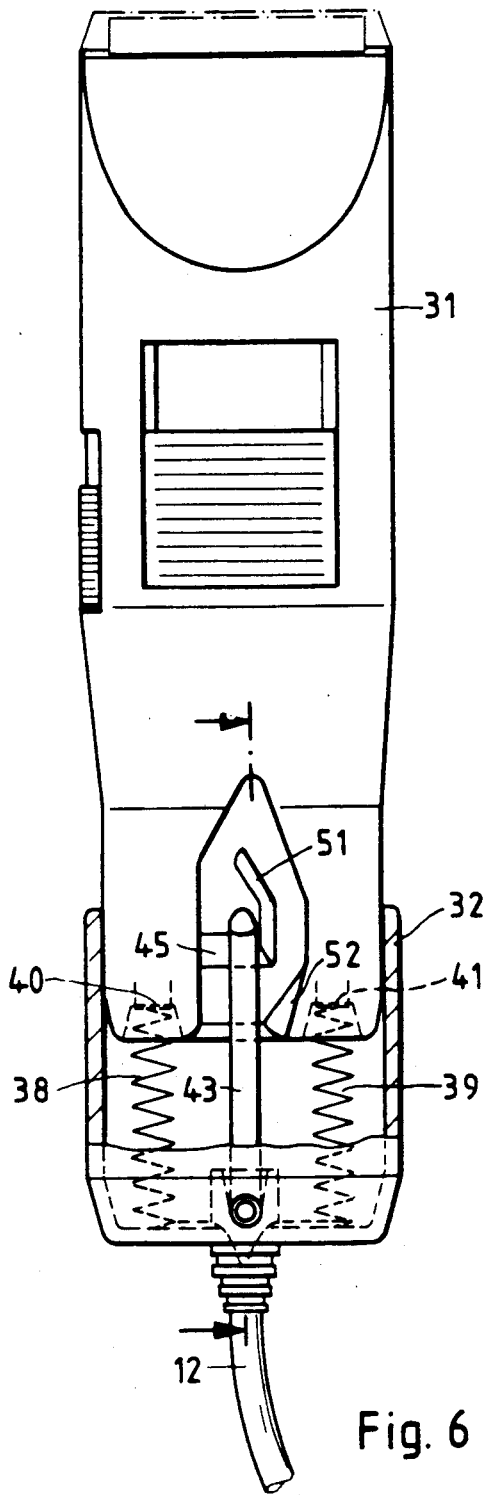
Figure 7:
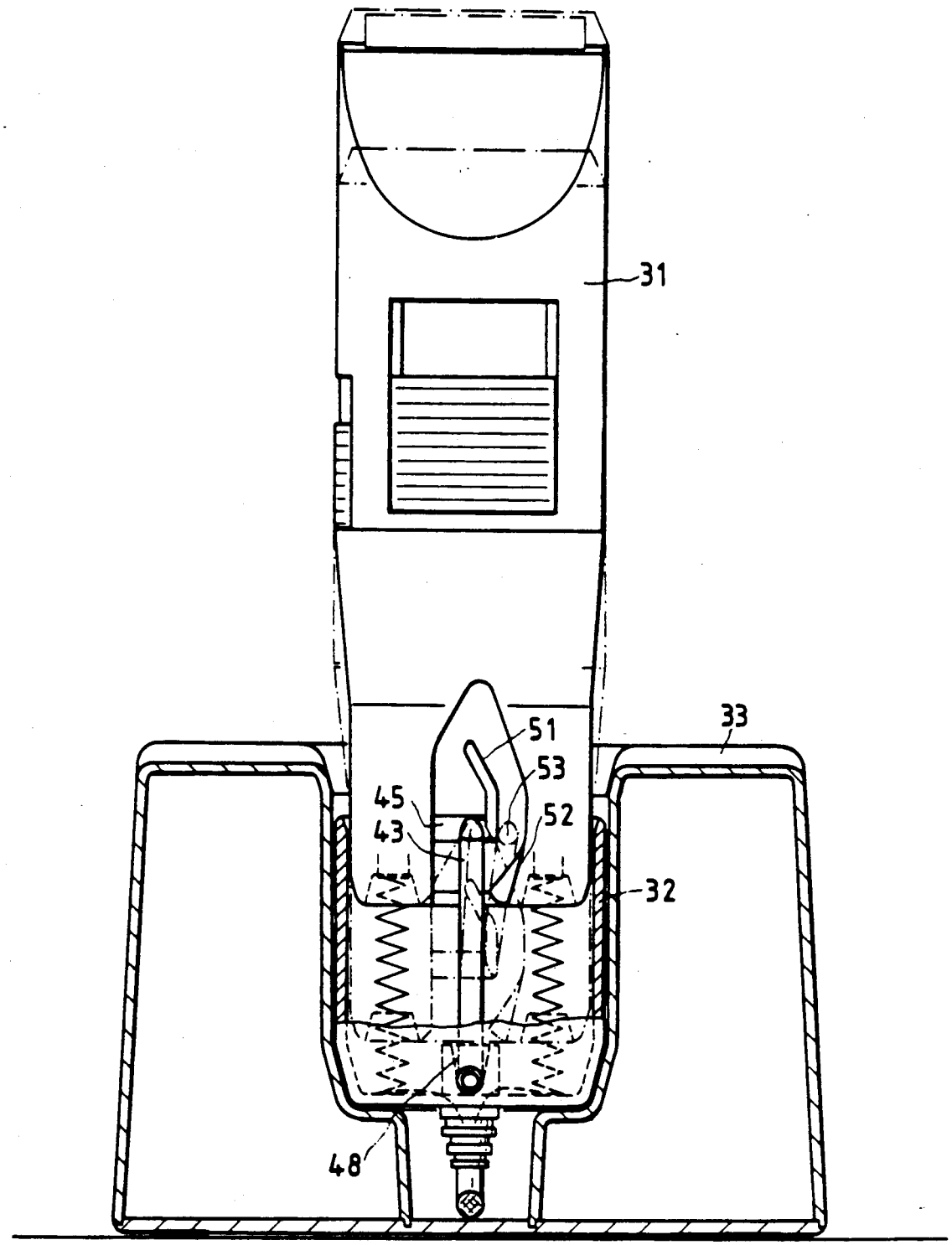

In the embodiment according to FIGS. 3 to 7 an axial adapter coil spring 34, which is guided partially by a pipe 35, is mounted in the adapter 32, which is adjusted in its outer form to a holder 33 and the hair cutting device 31. The upper portion of the adapter coil spring 34 is provided with a cap 36. A recess 37, in which the cap 36 engages when the hair cutting device 31 is set in the holder, is located on the lower end of the hair cutting device or tool portion 31. The adapter coil spring 34 is compressed by action of the force of gravity on the hair cutting device 1, until it takes the position shown in FIG. 4. Two additional coil contact springs 38, 39 are provided for electrical contact. These coil contact springs 38, 39 rest on contacts 40, 41 of the hair cutting device 31 and are connected with strands of the cable 12 (FIG. 6).

Two snap catches 42, 43 connect the adapter 32 with the hair cutting device 31 mechanically. Two inclined surfaces 44, 45 are located on the hair cutting device 1, over which the snap catches 42, 43 which are correspondingly inclined slide, when the hair cutting machine is pressed further downwardly. As soon as the snap catches 42, 43 lock in behind the inclined surfaces 44, 45, the adapter 32 is locked with the hair cutting device 1 (FIG. 5 and FIG. 6).

The snap catches 42, 43 are pivotally mounted in the adapter 32 at points 46, 47 so that the pivot angle is bounded by an appropriate notched piece 48. Moreover the leaf springs 49, 50 press on the snap catches 42, 43.

As seen from FIGS. 5 and 6 the hair cutting device 31 together with the adapter 32 can be removed from the holder 33 and can be operated with the adapter connected. Should the hair cutting device 31 be operated again without the adapter after successful charging of the battery, the hair cutting device again is pressed into the holder 33 (as shown with dot-dashed lines in FIG. 7) and discharges until the weight of the hair cutting device acts on the springs. Thus by the two raised guide members 51, 52 the snap catch 43(and/or is guided about the lock stud formed by the inclined surfaces 45 and/or 44 and occupies temporarily the position 53 of the snap catch 43 shown with dot-dashed lines.

A power supply unit 61, which is connected by the cable 12 with the adapter 62, integrated in a power supply plug is provided in the embodiment according to FIGS. 8 to 11. Like the adapters of the previous embodiments this adapter 62 is fit into a holder cavity 63 of a holder 64. Spring contacts 65 act as electrical connection means for the cable 12 with the contacts 66 of the hair cutting device 67. For mechanical connection of the adapter 62 with the hair cutting device 67 a ring-like shoulder 68 is provided on one side under the hair cutting device 67, to which the upper edge 69 of the adapter 62 connects.

Figure 9:
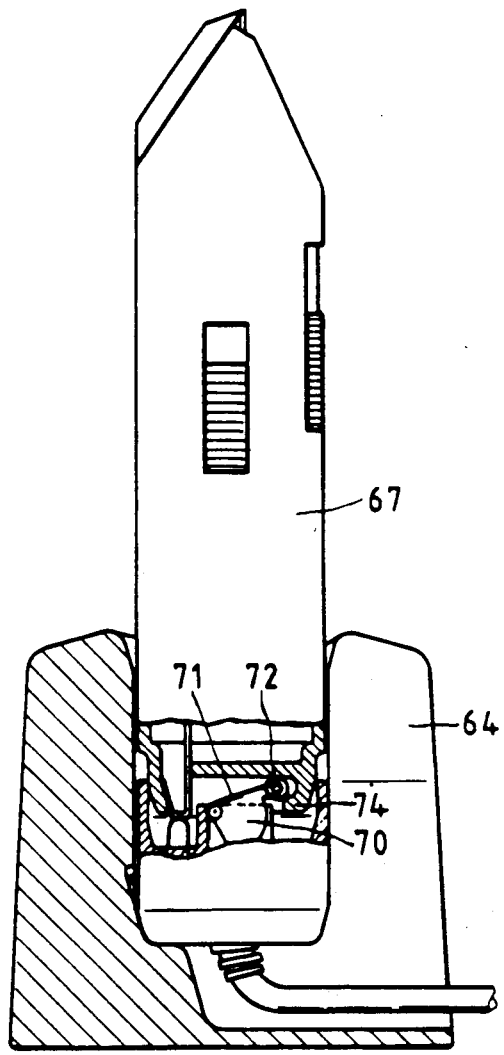
Figure 10:
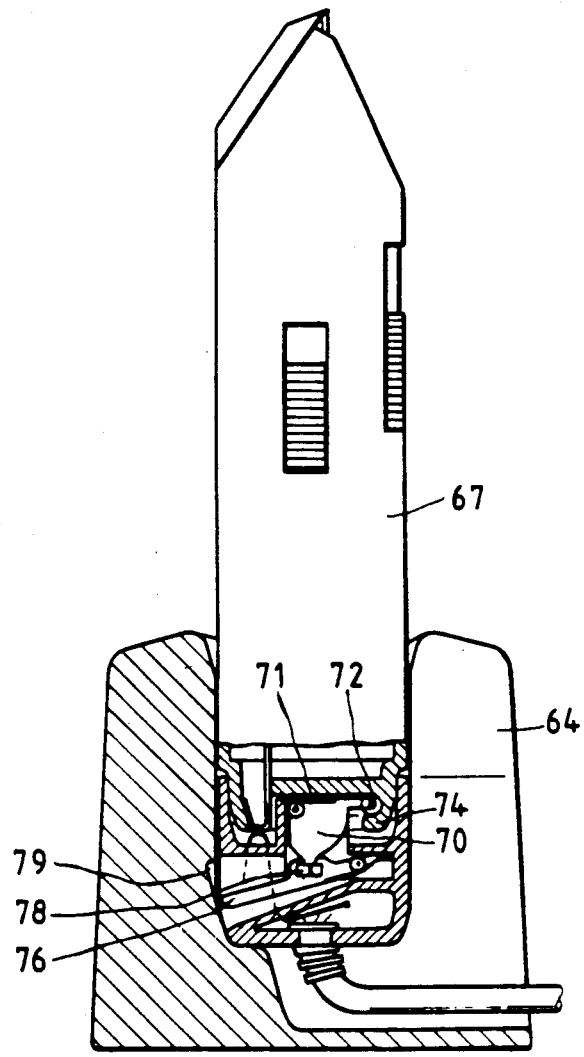

Further a known mechanical two-state device 70 is located in the adapter 62, which has a prime lever 71, whose end is provided with a roller 72. The prime lever 71 is pivotable about a pivot point 73 and can take the position shown in FIGS. 8 and 9 or the position shown in FIG. 10. The prime lever 71 is held in the position shown in FIG. 8 by a spring member at the pivot point 73. The prime lever 71 is advantageously a metal cast piece. The portion carried adjacent the roller 72 has a second portion which ends in a pin 75. On pivoting of the prime lever 71 in a clockwise direction this second portion comes to rest on the locking lever 76, presses it downwardly and locks in a recess 78 of the locking lever 76 (FIG. 10). The locking lever 76 is brought by the spring element 77 into the position shown in FIG. 8 when the pin 75 is not engaged on the locking lever 76.

Figure 8:
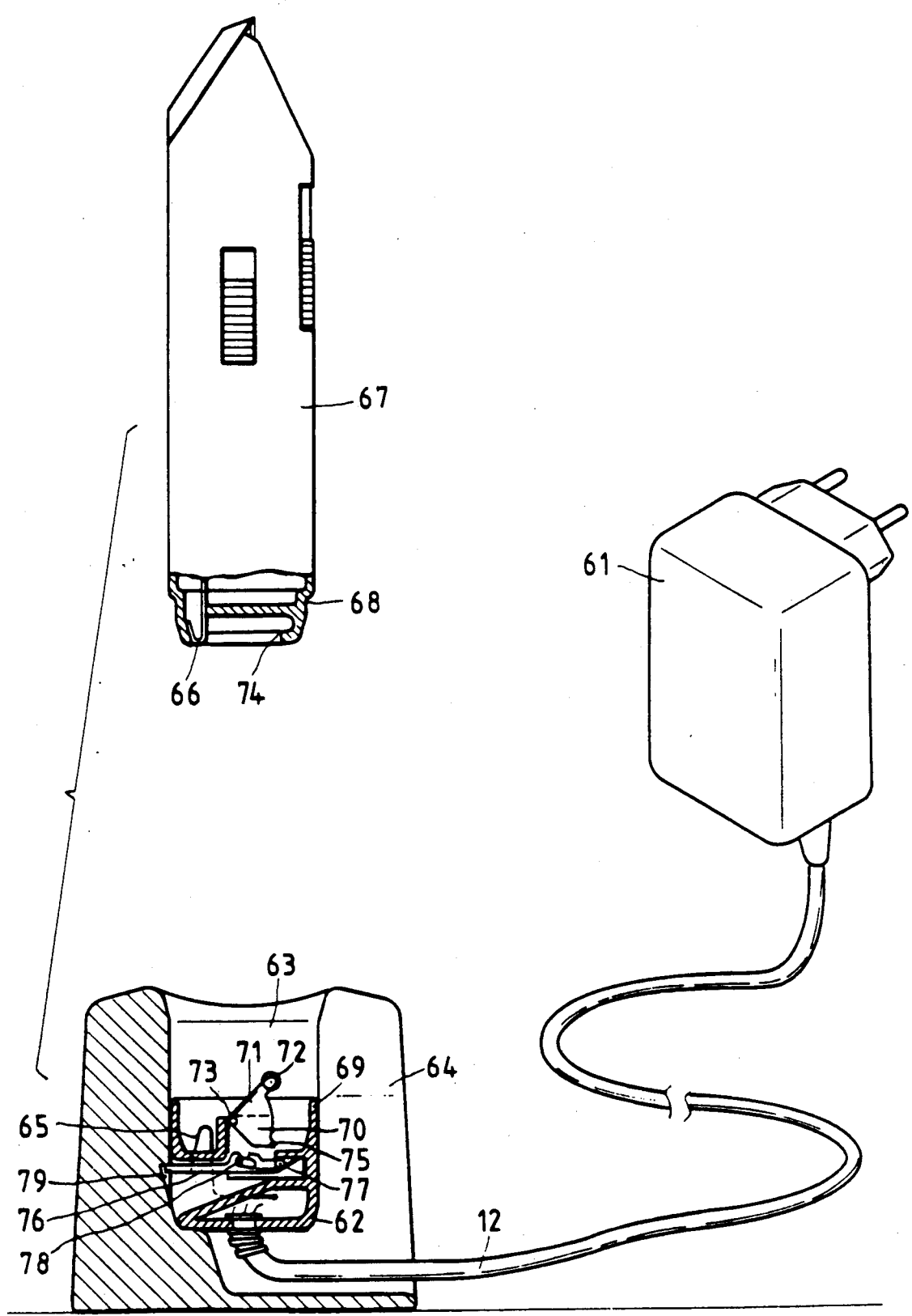

In the position shown in FIG. 8 the end of the locking lever 76 engages in a recess 79 of the holder 64, while the locking lever 76 is outside of the recess 79 in the position illustrated in FIG. 10.

From the position shown in FIG. 8 when the hair cutting device 67 is put in place the prime lever 71 is forced downwardly—however without that the pin 75 operates the locking lever 76. When the hair cutting device 67 is again taken the roller 72 remains outside the undercutting formed by the projection 74, so that the hair cutting device 67 can be removed from the holder 64 without the adapter 62. Thus by inserting the locking lever 76 into the recess 79 it is guaranteed that the adapter 62 remains in the holder 64. FIG. 9 shows that position in which the lever is pressed downwardly by the weight of the hair cutting device 67, however the connected between the hair cutting device 67 and the adapter 6 is not yet locked.

If additional pressure is exerted downwardly on the hair cutting machine 67, the position shown in FIG. 10 is reached. The prime lever 71 is stopped then by the locking lever 76, so that the roller 72 engages in the undercutting of the hair cutting device 67 and thus the adapter 62 and the hair cutting device 67 are locked together with each other.

In the swung out position of the locking lever 76 the locking lever releases the adapter 62 in the holder 64. The hair cutting device 67 can be operated together now with the adapter removed from the holder 64 and with the line voltage.

For decoupling the adapter from the hair cutting device again a pressure is applied to the hair cutting device 67 so that the locking lever 76 pivots laterally(-vertical to the paper plane) and releases the pin 75 and thus the prime lever 71.

This type of bistable or two state devices are known from ball point pens or from electrical pressure sensors. In electrical pressure sensors a locking catch stamped from sheet metal similar to the locking lever 76, which is pivotable in two planes, is used. At a first pressure the locking catch is pivoted out into a first plane and locks a pin, which is provided on the moving portion of the pressure sensor In the second pressure the locking catch is moved into the other plane and again releases the pin by an inclined surface so that the pressure sensor is released.

In the position shown in FIG. 8 the hair cutting device 67 is operated with current from the battery. On setting it in the adapter 62 without special pressure (FIG. 9) the spring contacts 65 rest on the contacts 66 so that the battery is supplied with current. The roller 72 slides past the projection 74 into the lower portion of the hair cutting device 67 so that the hair cutting device 67 is again taken from the holder 64 without the adapter 62.

Because of the augmented pressure on the hair cutting device 67 the prime lever 71 comes to the position shown in FIG. 10 so that the roller 72 is moved behind the projection 74. So that the adapter 62 is locked with the hair cutting device 67 and can be removed with the holder 64 together with it (FIG. 11).

By the repeated pressure on the hair cutting device 67 the prime lever 71 again springs into the position shown in FIG. 9 so that the adapter remains in the holder 64 when the hair cutting machine is used next.

In the embodiment which is shown in FIGS. 12 to 14, the holder also acts as the adapter. A plate-like first leg 81 of the holder is provided with a shell-like rest 82 for its lower portion, which encloses the lower portion of the hair cutting device 83. Moreover the cable contains spring contacts 84 for connection of the cable 12 with the unshown contacts of the hair cutting device 83. A second leg 85 is pivotally mounted on a first leg 81 and forms a supporting limb, which is spread apart from the first leg 81 by a spreading spring 86 engaging against an unshown stop.

Two catch cavities 87, 88 are provided on the side of the hair cutting device 83 facing the first leg 81. The position of the holder shown in FIG. 12 allows a removal of the hair cutting device 83 from the holder and battery operation. Should it be desired because of a reduced charge on the battery to provide the hair cutting device 83 with current by cable 12 in operation, then the hair cutting device 83 including the holder is grasped in such a way that the supporting limb 85 is pivoted in the direction of the first leg 81. Thus a catch 89 located on the supporting leg 85 comes into a catch cavity 88 so that the hair cutting device 83 can not be slid upwardly from the shell-like rest 82. Additionally a lever 90 connected with the supporting limb is pivoted inside the catch cavity 87 in such a way that it prevents a removal of the hair cutting device 83 from a first leg 81. Thus the holder is rigidly attached with the hair cutting device 83, which is operated then with voltage from the power supply unit.

To prevent the setting loose or release of the supporting limb 85 the lock between the hair cutting device and the holder is broken so that the supporting limb 85 can be pushed in the direction of the arrow 91 toward the first leg 81, so that a corresponding projection of the supporting leg 85 projects into a recess of the first leg 81 and the supporting leg locks.

FIG. 13 shows an additional view of the appliance holder in the deposited position with hair cutting device indicated with dot dashed lines. FIG. 14 shows the hair cutting device with the holder in a working position for line voltage operation.

Figure 15:
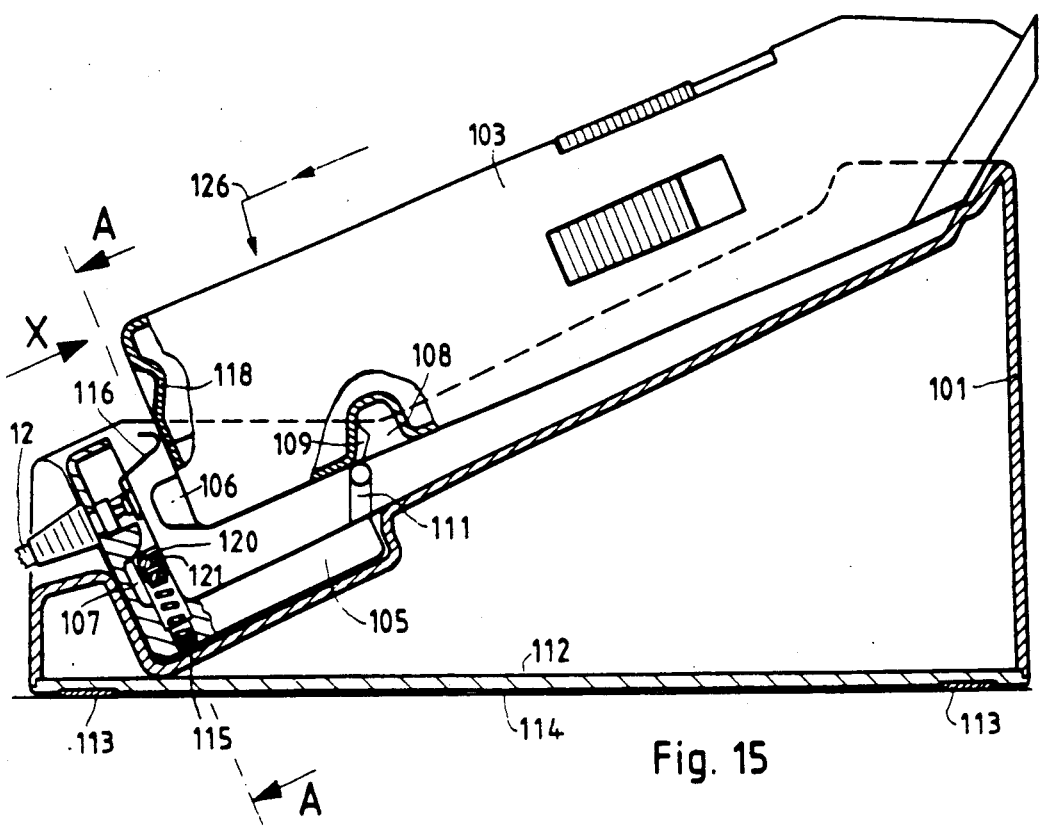
Figure 16:
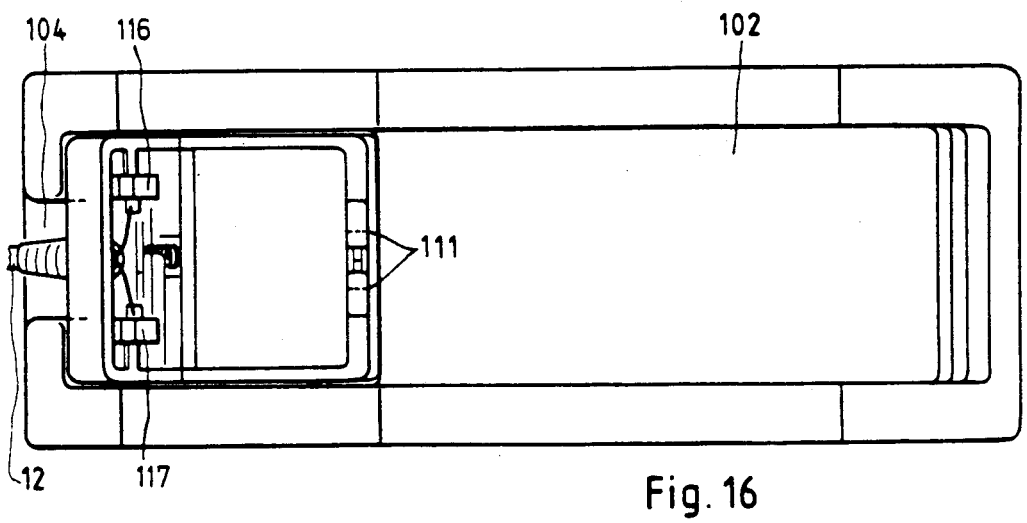

FIGS. 15 to 16 show a fifth embodiment in which FIG. 15 shows the hair cutting device deposited in the holder with decoupled adapter and with adapter coupled in FIG. 17. FIG. 16 is a top view of the holder with the adapter with the hair cutting device removed, while FIG. 18 is a cross sectional view through the adapter and holder taken along the section line A—A in FIG. 15 and FIG. 19 is a view of the bottom of the hair cutting device and associated devices seen in the direction X shown in FIG. 15.

In the embodiment shown in FIGS. 15 to 19 a rectangular holder 101 is provided with a depression 102, in which the hair cutting device 103 can be placed. The holder 101 has a recess 104 at the lower end of this depression 102, which allows the passage of the cable 12. The depression 102 is formed in the vicinity of the lower end for receiving the adapter 105. The adapter 105 is angular and encloses with its members substantially the lower end and partially a side of the hair cutting device 103.

For releasable attachment of the hair cutting device 103 with the adapter 105 an operation projection 106 is provided on the lower end of the hair cutting device, which engages in a recess 107 of the adapter 105 with the adapter plugged in. Furthermore the hair cutting device has a clip-receiving tool portion cavity 108 in whose lower side walls two locking studs 109, 110 are provided. With the coupled in adapter (FIG. 17) the locking clip 111 of the adapter is forced into the tool portion cavity 108 and engages behind the locking studs 109, 110. A adapter spring 115 presses the operating projection 106 on the upper rounded edges of the recess 107. Because of that, by the inclined surfaces of the operation projection 106 and the spring contacts 116, 117, the hair cutting device 103 presses against the locking clip 111 and locks the adapter with the hair cutting device.

The electrical connection is guaranteed by the spring contacts 116, 117 on the adapter 105 and the contacts 118 on the hair cutting device 103. Thus both the spring contacts 116, 117 and the contacts 118 (connecting elements) are formed so that an electrical contact occurs both in the decoupled and the coupled state of the adapter. Moreover the spring contacts 116, 117 keep the hair cutting device 103 in the position shown in FIG. 15.

To holder the adapter in the appliance holder, when it is not coupled to the hair cutting device, the adapter spring 115 is connected with a toggle joint comprising two arms 120, 121. The ends of the arms 120, 121 are formed by the bolts or pins 122, 123, which engage in the holes 124, 125 of the holder 101 on decompressing the adapter spring and thus halt the adapter. In the coupled state in adapter (FIG. 17) the adapter spring is compressed by the operating projection 106, which presses on the toggle joint. Then the toggle joint 120, 121 comes into the dot-dashed position and the bolts or pins 122, 123 are pulled out from the holes 124, 125 and thus release the adapter.

With the battery charged sufficiently the hair cutting device 103 is loosely placed on the holder 101, as is indicated in FIG. 15. Thus the battery is charged by the spring contacts 116, 117 and the contacts 118. In a new use of the hair cutting device the hair cutting device is easily removed upwardly as long as operation with the battery is possible. If however the hair cutting device 103 is necessary, when the charge of the battery is not sufficient, the adapter 105 can be plugged or coupled in by the motion shown by the arrow 126 in FIG. 15. Thus the operating projection 106 slides against the force of the adapter spring 115 into the recess 107. If the operating projection 106 is completely in the projection 107, the locking clip 111 can slide over the locking studs 109, 107, so that the adapter 105 is coupled in (FIG. 17). In subsequent operation of the hair cutting device 103 by the cable 12 the hair cutting device is removed from the holder with the plugged in adapter by a substantially linear motion. For decoupling of the adapter, when the hair cutting device was again operated without cable, a sliding of the hair cutting device and after that a rotational motion is required, as is indicated in FIG. 17 with the arrow 127.

Both in coupling and decoupling a second motion stage is possible when the first motion stage is substantially complete. Because of that the motions for coupling and decoupling are comparatively "carefree or trouble free". For coupling in it is enough when pressure on the lower portion of the hair cutting device is exerted in a direction shown from both arrows. As soon as the operating projection 106 is forced into the recess 107, the locking clip 111 slides over the locking studs 109, 110 so that the decoupling process is completed.

Feet 113 made of a material with a high adhesion coefficient are inserted on the bottom plate 112 of the holder 101 so that slippage of the holder on the stand surface 114 is prevented.

Figure 20:
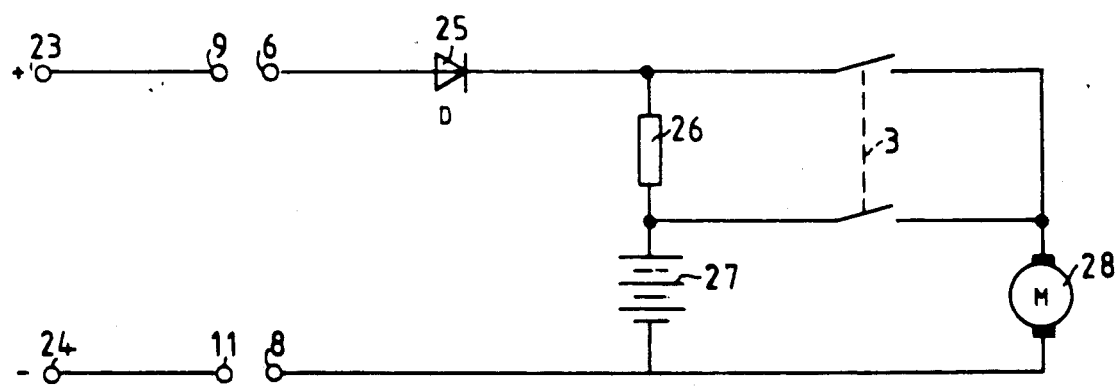
FIG. 20 is an electrical circuit diagram.

FIG. 20 shows a circuit for second to the sixth embodiments of our invention. The strands 23, 24 of the cable are each connected with a spring contact 9, 11 on which the contacts 6, 8 of the hair cutting device 1 rest, when the hair cutting device is deposited on the adapter. The electrical contact made is independent of whether the adapter is locked. As in the circuit already described in FIG. 2 a diode 25, a charging resistor 26, an accumulator 27 and a motor 28 are provided. A double-pole switch 3 acts as an off/on switch.

Figure 21:
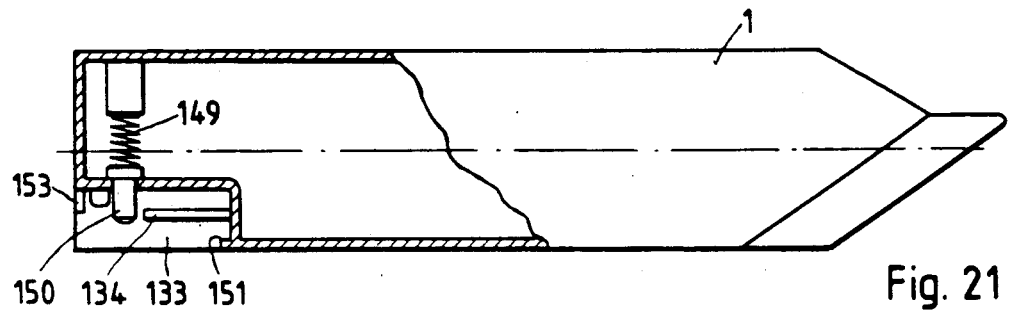

A sixth embodiment is illustrated in FIGS. 21 to 30. In FIG. 21 the hair cutting device 1 is shown in cross section in the left portion of the figure. The hair cutting device 1 has a recess 133 in its lower end, in which two contacting strips, are provided, of which only one contacting strip 134 is visible in FIG. 21. When not in use the hair cutting device 1 is deposited in a holder 135 (FIG. 22), in which the adapter 136 is locked in place.

Figure 23:
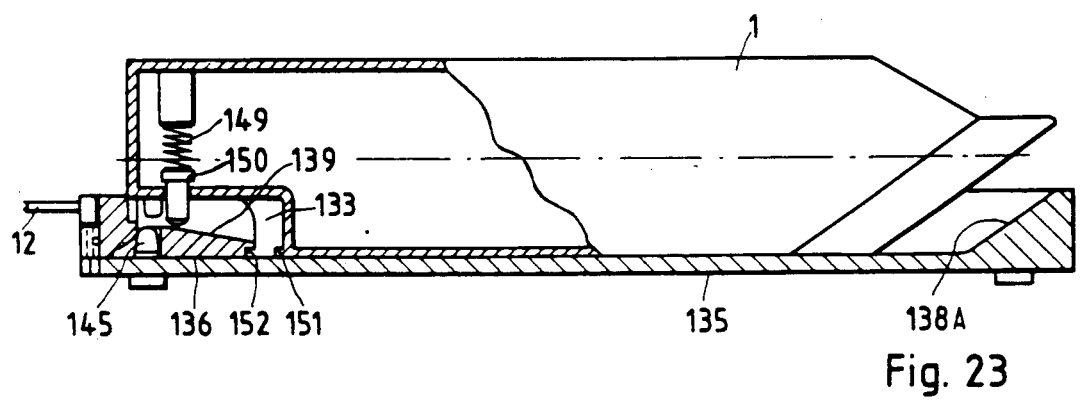

FIG. 23 shows the deposited hair cutting device in the holder 135. In the illustrated position, in which the hair cutting device 1 does not occupy the far left hand position in the holder 135, an electrical connection exists between the contacting strips 134 and additional contacting strips 132 mounted in the adapter 136. So that the hair cutting device 1 also comes into the position illustrated in FIG. 23 even when it is deposited carelessly or inaccurately, the holder 135 is provided on its front end with an inclined surface or surfaces which allow the hair cutting device 1 to slip into the correct position.

Figure 24:
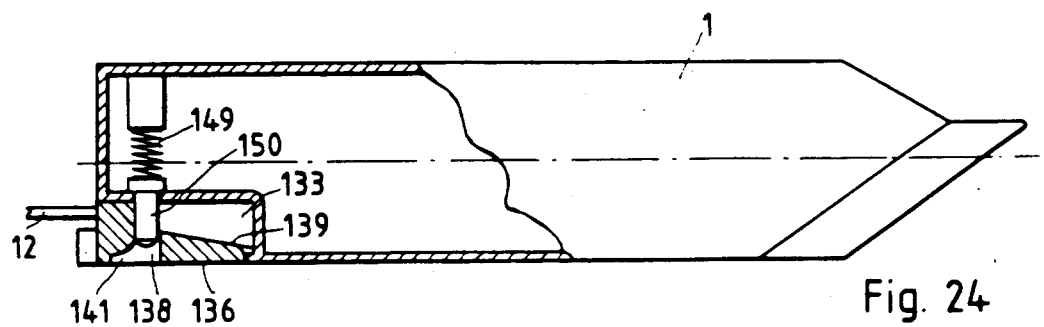

FIG. 24 shows the hair cutting device 1 with coupled in adapter so that an electrical connection is made between the cable 12 and the hair cutting device 1 and the hair cutting device 1 can be operated with the line voltage when the battery is discharged. The pin 150 forced into the passage keeps the adapter 136 level, while the adapter 136 is maintained vertical by the projection 151 and the shoulder 152 as well as by the tongues 144 (FIGS. 29 and 30) in combination with the grooves 153.

Additional structural details of the appliance holder and the hair cutting device are apparent from FIGS. 25 to 28.

The adapter 136 is illustrated accurately in FIGS. 29 and 30. FIG. 29a) shows a longitudinal cross sectional view, FIG. 29b) shows a side view and FIG. 29c) shows a top view. FIG. 30 shows a) a bottom view and b) a front view. The adapter 136 has a passage 138 extending from top to bottom which rises to the one inclined surface 139. In the lower region the passage 138 widens into an elongated hole 141 (FIG. 29a). Above the inclined surface 139 the passage continues into a throughgoing slot 142 (FIG. 29c). Hook-like spreading arms 143, which are movable resiliently to each other, are provided on the end of the adapter 136 adjacent the cable 12. Moreover the adapter 136 has laterally protruding tongues 144 above the spreading arms 143.

Figure 22:
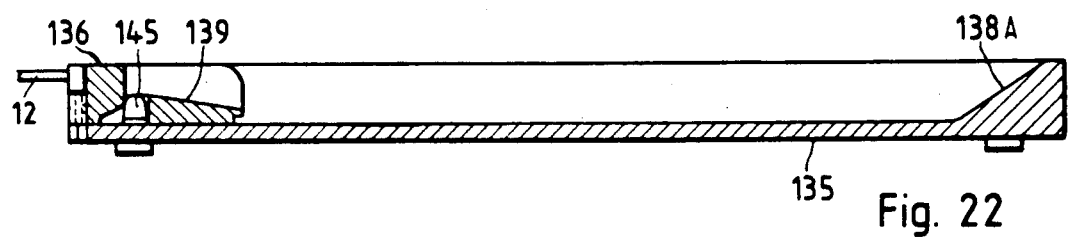

In normal operation the adapter 136 according to FIG. 22 is fixed in position on the holder 135. Thus the adapter 136 on one side is held by a conical stud 145, which engages in the passage 138 of the adapter 136, rigidly attached to the appliance holder 135. On the other side the spreading arms 143 engage under the lateral edges 146 (FIG. 26) of a recess 147 in the end wall 148 of the holder 135. The hair cutting device 1 can then, as indicated in FIG. 23, be deposited, so that the electrical connected between the contacting strips 134 and the contacting strips 132 located in the adapter 1 can be made. On taking out the hair cutting device 1 the adapter 135 remains connected with the holder 135.

When the hair cutting device is to be operated with the line voltage, because the battery is discharged, thus in a simple way the adapter 136 is decoupled from the holder 135 and coupled to the hair cutting device 1, as is shown in FIG. 24. Moreover the hair cutting device 1 is pushed from the resting position shown in FIG. 23 and into the left hand final position. A pin 150 mounted in the hair cutting device 1 slides then over the inclined surfaces 139 of the adapter 136 until it contacts the stationary stud on the appliance holder. A pin spring 149 is compressed. Further the spreading arms 143 are compressed by the side walls of a tool portion cavity 133 in a way which is not illustrated in detail and are free of the lateral edges 146.

If the hair cutting device 1 is tilted upwardly at the upper end or easily moved upwardly, the pin 150 is forced by the force of the pin spring upwardly into the passage 138 of the adapter 136. Simultaneously the adapter 136 is driven by a projection 151 into the recess 133, which engages behind an edge 152 of the adapter 136. Thus the desired locking of the adapter 136 and the hair cutting device 1 occurs. The tongues 144 of the adapter 136 engage in the corresponding groove 153 (FIG. 27) of the hair cutting device 1(see FIG. 28).

When the adapter 136 and the hair cutting device 1 are to be decoupled again, the hair cutting device 1 need only be deposited in the holder 135 and pressed gently downwardly. Then the hair cutting device 1 can be put in the left hand end position in the holder 135 by the fixed conical stud 145 engaging the bulged portion 140 in the elongated hole 141. Then the pin 150 is pressed by the stationary conical stud 145 and pushed out from the passage 138. When the hair cutting device 1 is pushed to the right into the position shown in FIG. 23, the spreading arms engage under the edges 146 of the end wall 148 and the locked in configuration of the adapter 136 and the holder 135 shown in FIG. 23 again occurs.

In the seventh embodiment shown in FIGS. 31 to 34 the portion of the hair cutting device 1 serving for connection with the adapter 160 is formed like the same portion in the hair cutting device of the sixth embodiment(especially see FIG. 21). The adapter 160 alone and the portion of the holder cooperating with it are however different.

FIG. 31 shows the holder 154 with the adapter 160 coupled to it and with hair cutting device 1 deposited loosely on a bearing surface 155, which is connected electrically with the adapter 160 in a manner similar to that of the sixth embodiment. For clarity the electrical connections are not shown in FIGS. 31 to 34. The hooks 157 which are connected by spring members 158 in one piece with the end wall 156 of the holder 154 serve to retain the adapter 160 in the holder 154. In the unclamped state of the spring members 158 the hooks project beyond the inner surfaces of the end wall 156 and prevent a motion of the adapter 160 in the direction of the axis of the pin 159, when the adapter is returned to the end wall 156. A motion of the adapter in the direction of the arrow Y is only possible against the force of an additional spring 161, which is mounted in a passage of the holder 154 and presses the pin 159, which projects through the elongated hole 163, in the direction of the end wall 156 by a guiding and retaining member 162.

In the illustrated position the hair cutting device 1 can be taken vertically upwardly and also in the direction of the arrow Y without the adapter 160 following it.

FIG. 32 shows the view of the holder 154 with the adapter 160 inserted from the direction X (FIG. 31). Thus the hair cutting device 1 is indicated with dot-dashed lines.

FIG. 33 shows a portion of the holder 154, especially the end wall 156 from the direction Y (FIG. 31), the hair cutting device 1 similarly being shown with dot-dashed lines and an invisible portion of the holder 154 and the adapter 160 are shown with dashed lines.

Figure 34:
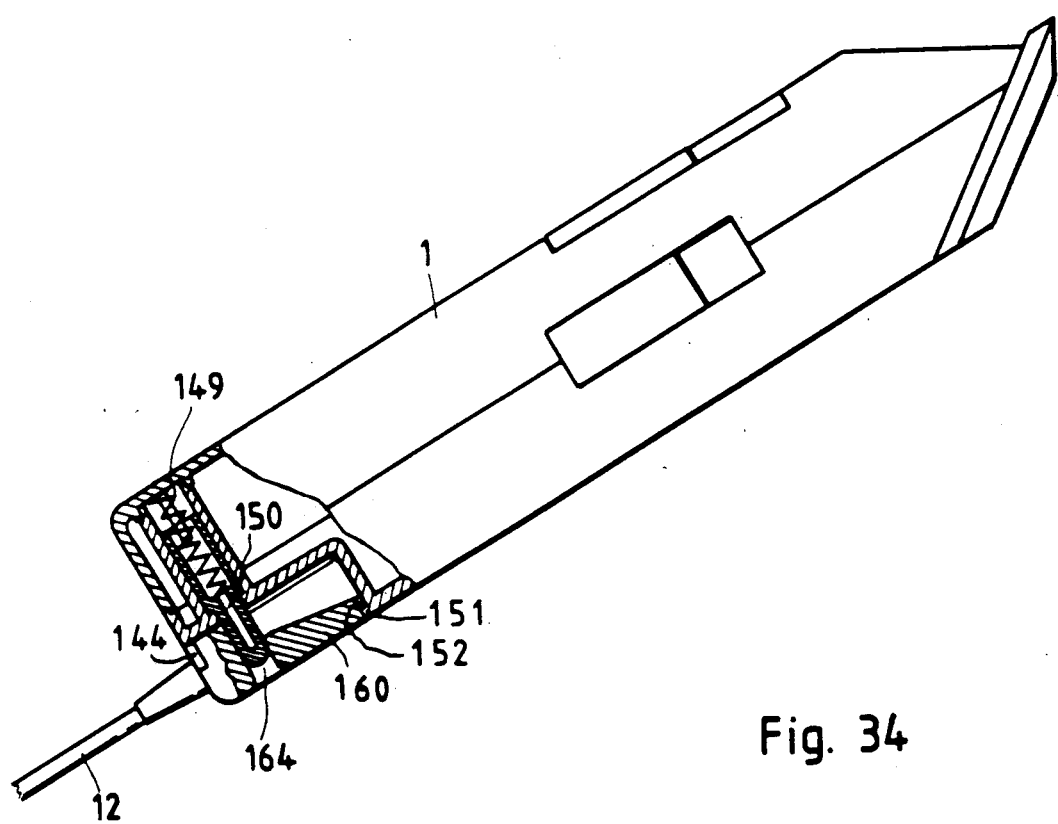

In reference to FIG. 31 the decoupling of the adapter 160 simultaneously coupled to the hair cutting device 1 from the holder 154 is described. Moreover the hair cutting device 1 is moved oppOsite the direction of the arrow Y until the hooks 157 engage approximately flush with the inner surfaces of the end wall 156. Simultaneously the pin 150 aligns with the passage 164. Thus tongues 144 are inserted in the grooves 153 and the projection 151 engages under the shoulder 152 so that the adapter 160 follows the hair cutting device opposite the direction of the arrow X on lifting it. Thus the stud 150 is drawn from the passage 164 so that the pin 150 can be forced into the passage 164 because of the force of the pin spring 149. Thus the adapter is locked in the direction Y in the hair cutting device 1. This is also shown in FIG. 34.

After ending line voltage operation (FIG. 34) the hair cutting device can be put in the holder 154 (gently pressing down) in such away that the position shown in FIG. 31 is automatically taken. From this position a withdrawal of the hair cutting device for line power operation or for battery operation, as already illustrated, is possible. Because of the ball-shaped structure and the slidability of the stud 159 no jamming or clamping occurs—even when the hair cutting device 1 is tilted or tipped on withdrawal.

Under the tool portion cavity hole provided for the cable 12 in the end wall 156 the holder 154 is provided with two additional openings 165, 165' opening below, so that the cable 12 can be guided under the holder 154 to the adapter 160. The locking of the cable appears orderly and can be undertaken when the line voltage operation is about to be expected. The following cable extending downwardly is not troublesome.

The tool portion of the electrical appliance by definition comprises hair cutting device 1 in the above-described embodiments of our invention.

It will be understood that each of the elements described above, or two or more together, may also find a useful application in other types of constructions differing from the types described above.

While the invention has been illustrated and described as embodied in an electrical connection between a circuit board and a hybrid circuit structure and process for making same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

What is claimed is:

1. In a mechanism for an electrical appliance having a tool portion with a rechargeable battery, said tool portion being structured for line-powered operation or battery-powered operation according to choice, and also having an adapter for charging of the rechargeable battery, a cable connected to the adapter, said adapter being electrically connectable by said cable to a current source, a holder structured to receive said tool portion and said adapter and said holder; said adapter and said tool portion having means for connection with each other so that said adapter is electrically connectable with said tool portion so as to charge the battery for said battery-powered operation, and for said line-powered operation the adapter, and the tool portion being removable from the holder and being electrically connectable with each other, the improvement further comprising additional means for releasable connection of said adapter and said holder; and means for releasable locking together the adapter and the tool portion structured in such a way that, when the adapter and the tool portion are connected together mechanically while received in the holder and when said adapter is connected is said holder by said additional means for releasable connection, the adapter is released from the holder, so that said tool portion with said adapter electrically connected for said line-powered operation may be removed from said holder and, when said adapter and said tool portion are returned to said holder and connected with said holder by said additional means for releasable connection of said adapter and said holder, said tool portion is disconnectable from said adapter for said battery-powered operation, wherein said tool portion is provided with a tool portion cavity and said adapter substantially fits in the tool portion cavity of said tool portion and the means for locking together the adapter and the tool portion comprise an axial-spring loaded pin projecting from the tool portion and a passage provided in the adapter, in which said axial-spring loaded pin fits on engagement of said adapter and said tool portion, the axial-spring loaded pin projecting from said tool portion into said cavity and into said passage of said adapter, when said adapter is connected with said tool portion, and a plurality of projections and tongues and additional grooves and recess are provided on said tool portion and said adapter, so that a motion of said adapter from said tool portion in the longitudinal direction of said pin is prevented, when said tool portion is connected with said adapter.

2. The improvement defined in claim 1 wherein said adapter has a slot extending longitudinally up to one end of said adapter from said passage, which enlarges toward said end of said adapter and two laterally projecting ones of said tongues located at the other end of said adapter.

3. The improvement defined in claim 1 wherein an additional stud and an additional adapter spring are provided in said holder, said additional stud projecting substantially vertically from a bearing surface of said holder and being slidable against a force of said additional adapter spring in the longitudinal direction of said holder and a plurality of hooks projecting beyond an end wall of said holder so that said hooks partially engage over said adapter, when said adapter is at said end wall.

4. The improvement defined in claim 3 wherein said additional stud has a diameter which is smaller than the diameter of said passage, and said end of said additional stud is spherical corresponding to said diameter of said passage.

5. The improvement defined in claim 3 wherein said holder is provided with a passage running longitudinally, in which said additional adapter spring and guide and retaining members are mounted and said additional stud is mounted on said guide and retaining members, which project through an elongated hole in said bearing surfaces of said holder.

6. The improvement defined in claim 5 wherein said holder has an inclined one of said bearing surfaces for said tool portion, said cable issues from said lower end of said bearing surface and a downwardly opening is provided both in the vicinity of a lower end of said bearing surface and under an upper end of said bearing surface.

7. The improvement as defined in claim 1, wherein said tool portion is a hair cutting device.

* * * * *